United States Patent
Hosono et al.

(12) 
(10) Patent No.: US 6,457,542 B1
(45) Date of Patent: Oct. 1, 2002

(54) AIR-INTAKING AND EXHAUSTING APPARATUS IN AIR COOLING SYSTEM FOR PDU AND DOWN-CONVERTER

(75) Inventors: Yoshio Hosono; Osamu Hasegawa; Masaki Amakai; Hideharu Takemoto; Akihito Ohtsu; Taichi Ogawa, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/609,649

(22) Filed: Jul. 3, 2000

(30) Foreign Application Priority Data

Jul. 5, 1999 (JP) ............................................ 11-191037

(51) Int. Cl.[7] .............................................. B60K 11/06
(52) U.S. Cl. ..................................... 180/68.1; 180/68.2
(58) Field of Search ............................. 180/68.1, 68.2, 180/68.3, 65.2, 68.5

(56) References Cited

U.S. PATENT DOCUMENTS

| | | | |
|---|---|---|---|
| 4,934,449 | * 6/1990 | Watt et al. | 180/68.1 |
| 5,031,712 | * 7/1991 | Karolek et al. | 180/68.5 |
| 5,082,075 | * 1/1992 | Karolek et al. | 180/68.1 |
| 5,193,608 | * 3/1993 | Sekine et al. | 180/68.1 |
| 5,427,502 | * 6/1995 | Hudson | 180/68.1 |
| 5,490,572 | * 2/1996 | Tajiri et al. | 180/68.1 |
| 5,542,489 | * 8/1996 | Allison et al. | 180/68.5 |
| 5,588,482 | * 12/1996 | Holka | 180/68.1 |
| 6,029,762 | * 2/2000 | Kepner | 180/68.1 |
| 6,167,976 | * 1/2001 | O'Neill et al. | 180/68.1 |
| 6,213,233 | * 4/2001 | Sonntag et al. | 180/68.1 |
| 6,230,677 | * 5/2001 | Setsuda | 180/68.5 |
| 6,237,357 | * 5/2001 | Hirao et al. | 180/68.1 |

* cited by examiner

Primary Examiner—Brian L. Johnson
Assistant Examiner—Jeffrey Restifo
(74) Attorney, Agent, or Firm—Armstrong, Westerman & Hattori, LLP

(57) ABSTRACT

An air inlet is provided at the bottom of a vehicle to open downwardly. The air inlet is connected by a first tube to an air cooler for a PDU and a down converter. A fan for inputting the flow of air and turning its direction 90 degrees is connected at the downstream of the air cooler. The fan is further connected by a second tube to an exhaust outlet. The air inlet is located above a fuel tank thus to prevent any object jumping up from the road surface from straightforwardly entering the air inlet while the vehicle is running. The exhaust outlet is located above a silencer and can thus be prevented from being frozen in the winter. Using the above arrangement, the present invention embodies an air intaking and exhausting apparatus in an air cooling system for air cooling the PDU and the down converter at higher efficiency without the help of the air cooler mounted in the interior of the vehicle.

19 Claims, 5 Drawing Sheets

AIR-INTAKING AND EXHAUSTING APPARATUS IN AIR COOLING SYSTEM FOR PDU AND DOWN-CONVERTER

BACKGROUND OF THE INVENTION

1. Field of the Invention

The present invention relates to an air-intaking and exhausting apparatus in an air cooling system for a PDU (power drive unit) and a down converter and particularly, to an air-intaking and exhausting apparatus in an air cooling system for a PDU (power drive unit) and a down converter for use in a hybrid vehicle.

2. Description of the Related Art

For tackling multiple environmental issues to clean the air source, a variety of hybrid vehicles have been researched and developed. Such a hybrid vehicle is known to have an internal combustion engine and an electric motor which is energized with power sources such as a high-voltage and high-power battery. The battery may be of as a high voltage as 144 volts which is fed to an inverter composed of high-current transistors and capacitors for driving e.g. a three-phase electric motor. The hybrid vehicle also includes a down converter for converting the high voltage to a lower voltage.

The inverter and the down converter draw higher currents and will generate heat thus providing a high temperature. In common, the generated heat is attenuated by the cooling action of an air cooler mounted in the interior of the vehicle. However, as the air cooler is used for the purpose, the effect of cooling down the interior of the vehicle will be offset.

SUMMARY OF THE INVENTION

It is thus an object of the present invention to provide an air-intaking and exhausting apparatus in an air cooling system for cooling down a PDU and a down converter at higher efficiency without the help of an air cooler mounted in the interior of a vehicle.

The first feature of the invention lies in that an air-intaking and exhausting apparatus in an air cooling system for a PDU and a down converter comprises an air inlet provided in the bottom of a vehicle to open downwardly, an air cooler for the PDU and the down converter connected by a first tube to the air inlet, and an exhaust outlet provided to open downwardly and connected by a second tube to the air cooler, wherein the first tube and the second tube are placed on a horizontal plane and extended substantially orthogonal to each other.

The second feature of the invention lies in that at least a portion of the air inlet faces against the top of a fuel tank.

The third feature of the invention lies in that the air cooler includes a fan for inputting and outputting the flow of air to cool down the PDU and the down converter, and the fan is adapted for turning the direction of the flow of air substantially 90 degrees.

The fourth feature of the invention lies in that the exhaust outlet is located above a silencer.

According to the first feature, the distance between the air inlet and the exhaust outlet is maximized. Also, the air-intaking and exhausting apparatus in an air-cooling system can be mounted on a vehicle without trading off the design quality of the vehicle. According to the second feature, the air inlet hardly allows any object jumping up from the road surface to enter straightforwardly. According to the third feature, the direction of the flow of air can be turned 90 degrees without using any 90-degree elbow tube. According to the fourth feature, the exhaust outlet can be prevented from being frozen, narrowed, and blocked in the cross section.

DETAILED DESCRIPTION OF THE PREFERRED EMBODIMENTS

Figure 5:
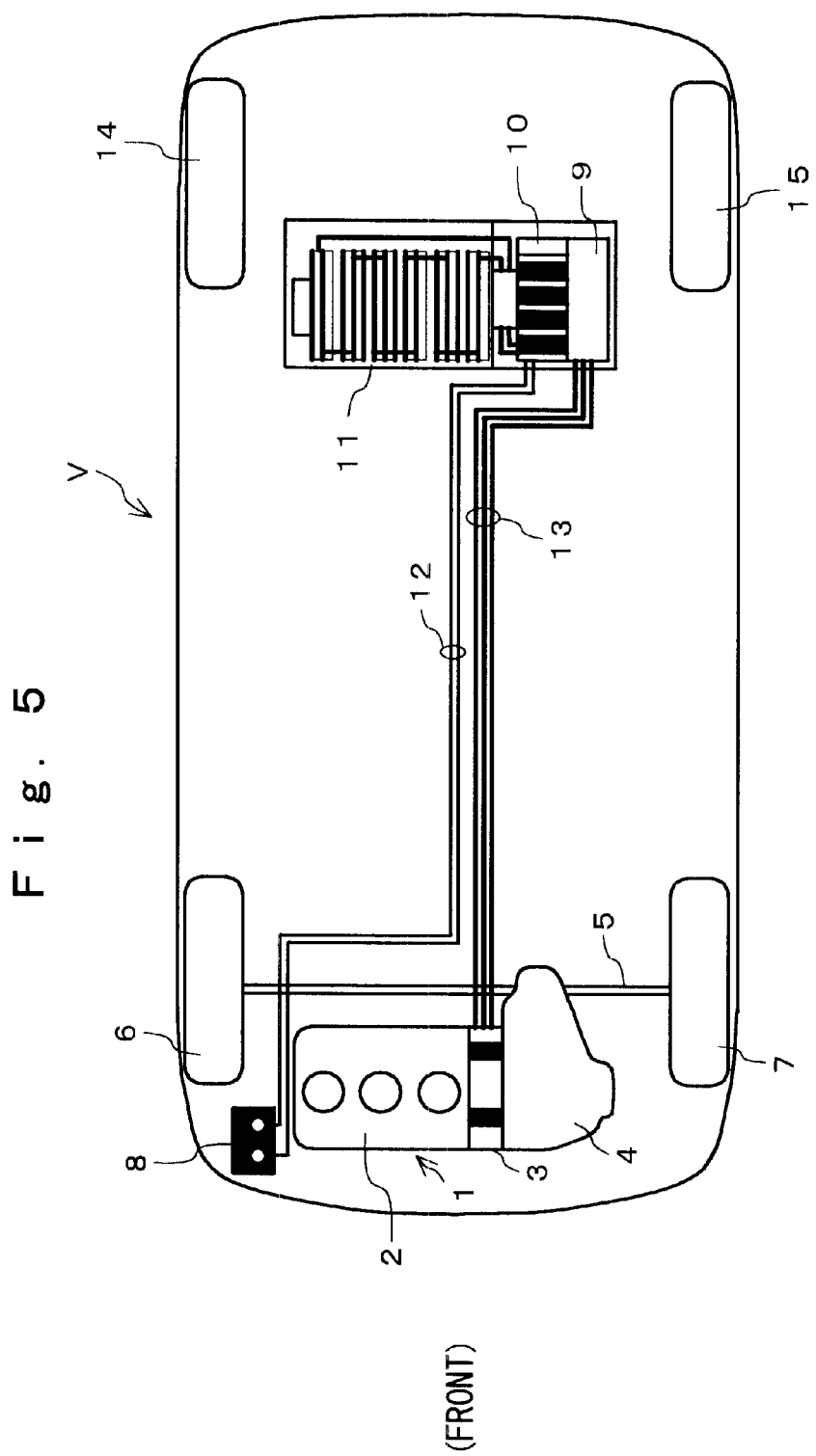
FIG. 5 is a plan view of a primary part of a hybrid vehicle on which the air-intaking and exhausting apparatus in the air cooling system according to the present invention can preferably be mounted.

The present invention will be described in more detail referring to the accompanying drawings. FIG. 5 is a plan view showing a primary part of a hybrid vehicle to which an air-intaking and exhausting apparatus in an air cooling system according to the present invention is preferably mounted.

As shown, an engine 1 mounted in a front section of the hybrid vehicle V comprises a three-cylinder internal combustion engine 2, a motor generator 3 directly joined to the engine 2 for complementing its output, and a transmission 4. The output of the engine 1 is transmitted by a shaft 5 to a pair of front wheels 6 and 7. A first battery 8 is provided for supplying an ignition unit of the engine 2 and a lighting unit with an electricity of, for example, rated 12 volts DC.

Mounted in a rear section of the vehicle V are a PDU for driving the motor generator 3, a down-converter 10 for transmitting regenerated current generated by the motor generator 3 to the first battery 8, and a second battery 11 provided as a power source for the motor generator 3. The second battery 11 may be of a Ni-MH type with rated 144 volts. The down-converter 10 and the first battery 8 are electrically connected to each other by a single-phase cable 12 while the motor generator 3 and the PDU 9 are electrically connected by a three-phase (high-pressure) cable 13. Also, a pair of rear wheels 14 and 15 is mounted at both, left and right, sides in the rear section of the vehicle V.

In action, a direct current supplied from the second battery 11 is converted to a three-phase alternate current by an inverter in the PDU 9 and then supplied to the motor generator 3. The motor generator 3 is joined to a crank shaft of the engine 2 as arranged for, when energized, driving and complementing the driving force of the engine 2 or, when driven by the engine 2 running in idling mode, generating an electricity which is stored in the first battery 8.

Figures 1A, 1B:
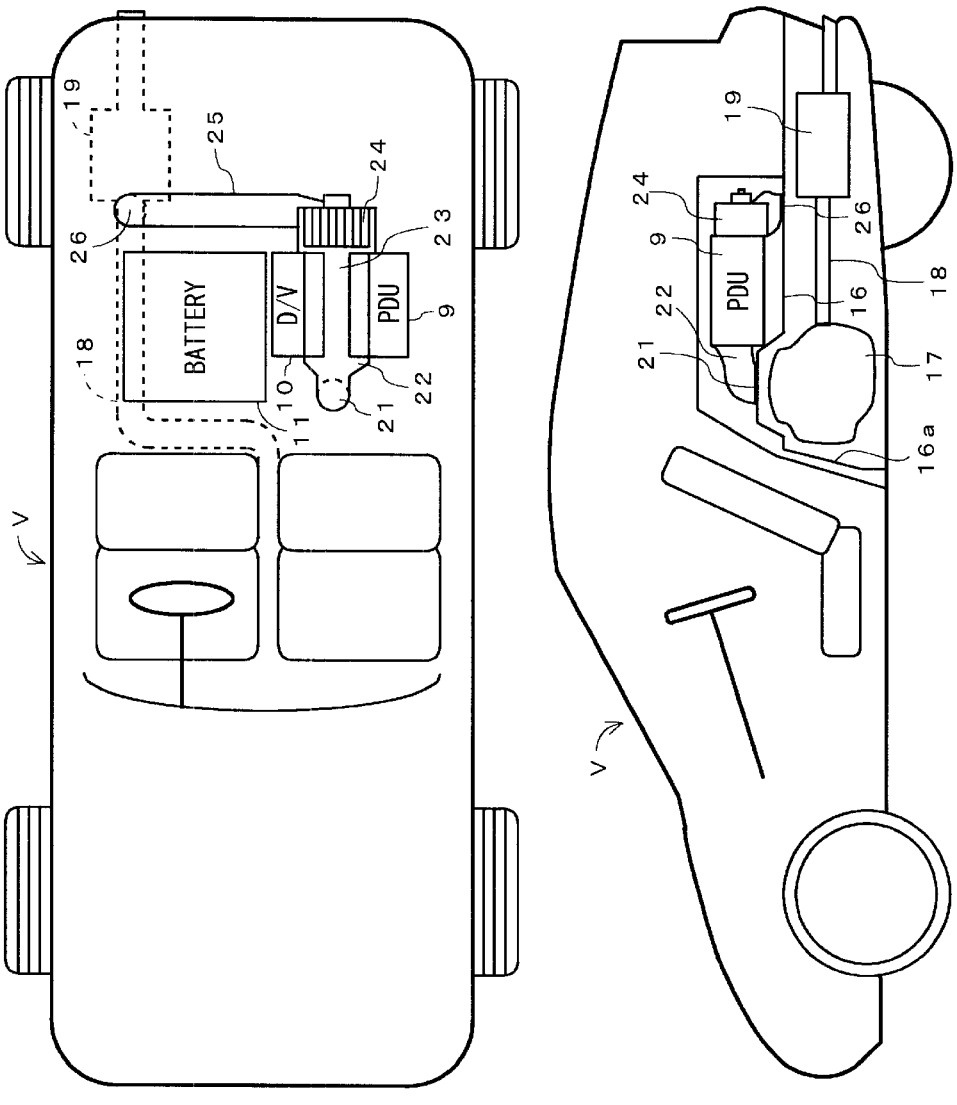
FIGS. 1A and 1B are respectively a schematic plan view of a vehicle equipped with an air-intaking and exhausting apparatus in an air cooling system for a PDU and a down converter according to one embodiment of the present invention and a schematic side view of a primary part of the same seen through a side body of the vehicle.

FIG. 1A is a schematic plan view of the bottom of a vehicle equipped with the air-intaking and exhausting apparatus in the air-cooling system for the PDU and the down-converter according to the present invention. FIG. 1B is a schematic side view of a primary part of the present invention seen through a side body of the vehicle.

As shown, a fuel tank 17, an exhaust pipe 18 connected to the engine 2, and a silencer 19 connected to the exhaust pipe 18 are mounted beneath a floor 16 of the rear section of the vehicle V. An air inlet 21 for the air cooling system in the floor 16 is located above the fuel tank 17. The air inlet 21 is fluidly communicated with an air cooler 23 for the PDU and the down-converter. The fuel tank 17 has an appropriate shape, e.g. a polyhedron or a convex polyhedron, corresponding to the configuration of the floor 16 located at the opposite side. The space between a slope 16a of the floor 16 and the fuel tank 17 is contemplated to have a non-uniform width and a bent.

The air cooler 23 is linked to a fan 24, such as a sirocco fan, which is designed for turning the direction of the flow of incoming air substantially 90 degrees and connected via a tube 25 to an exhaust outlet 26 located above the silencer 19. The air inlet 21 and the exhaust outlet 26 open towards the lower side. As shown, the air cooling system has a right triangle shape comprising a first duct module including the air cooler 23 and a tube 22 extending substantially in parallel with the vehicle V and a second duct module including the tube 25 which is bent at substantially a right angle at the fan 24. The air inlet 21 and the exhaust outlet 26 are provided at two vertices of the right triangle shape respectively. The first and second duct assemblies are placed on substantially a horizontal plane.

Figure 2:
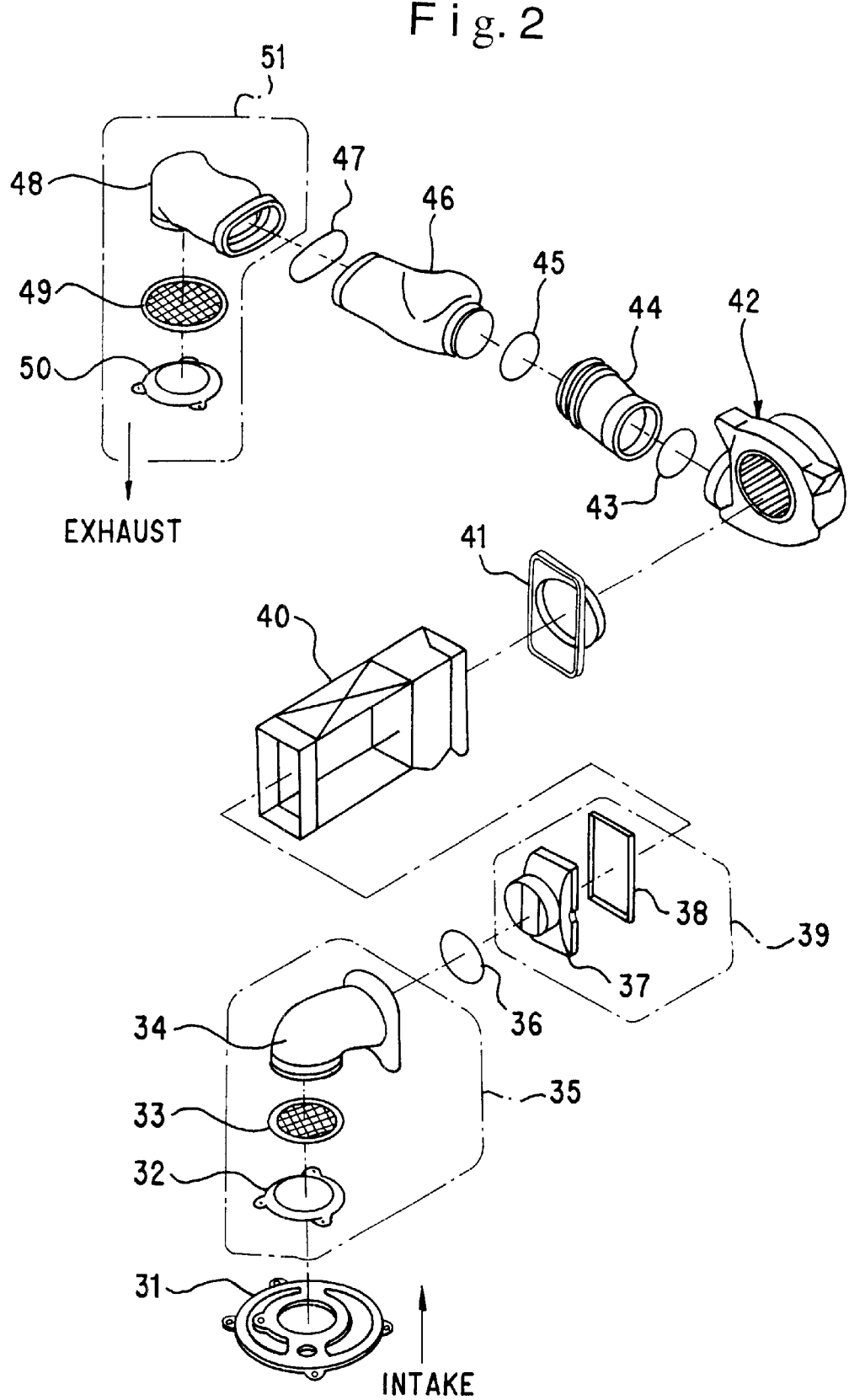
FIG. 2 is an exploded perspective view showing an example of the air cooling system.

An example of the air cooling system will now be explained referring to an exploded perspective view of FIG. 2. The air inlet 21 may incorporate a maintenance lid 31 of the fuel tank. The maintenance lid 31 is fixedly mounted by e.g. screws to about the opening of the floor 16. A flange 32 is placed on the top of the maintenance lid 31 and joined via a mesh screen 33 to a tube 34, The flange 32, the screen 33, and the tube 34 constitute in a combination a tube assembly 35. The tube 34 is connected by an annular spring 36 to a duct assembly 39 consisting mainly of a duct 37 and a ring duct seal 38.

The duct assembly 39 is connected to a heat sink case 40 in the down converter and the PDU which will be described later. The outlet of the heat sink case 40 is connected by a grommet 41 to a fan assembly 42 such as a sirocco fan. The outlet of the fan assembly 42 is turned 90 degrees from the inlet and is further connected by a spring 43 to a tube 44. The tube 44 is connected by an annular spring 45 to a duct 46 and then by another annular spring 47 to a tube 48. The exit of the tube 48 is fixedly joined to a screen 49 and a flange 50. The tube 48, the screen 49, and the flange 50 constitute a tube assembly 51. The flange 50 is tightened by e.g. screws to the opening of the floor 16.

Figure 3:
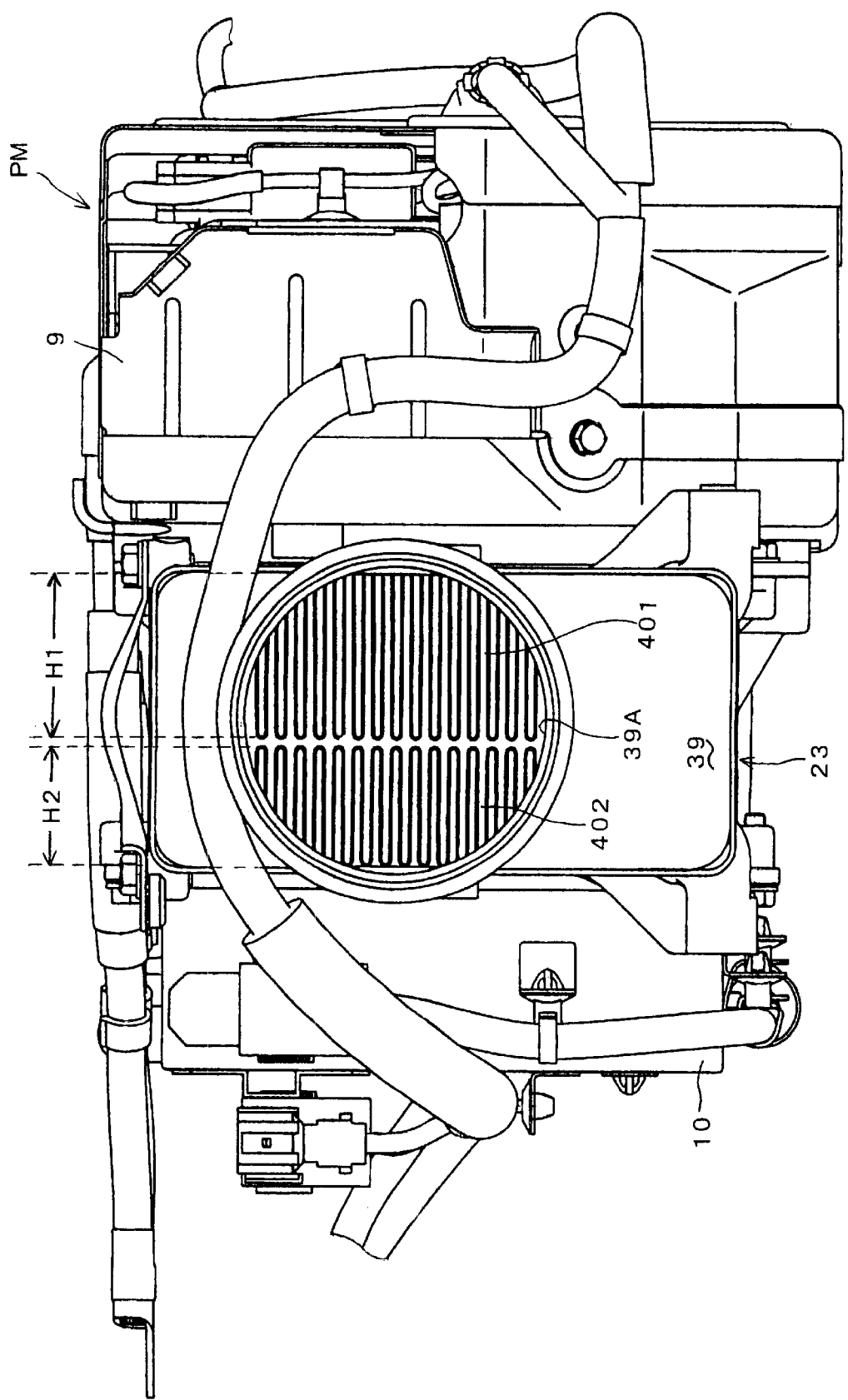
FIG. 3 is a front view of the air cooler with the PDU and the down converter.
Figure 4:
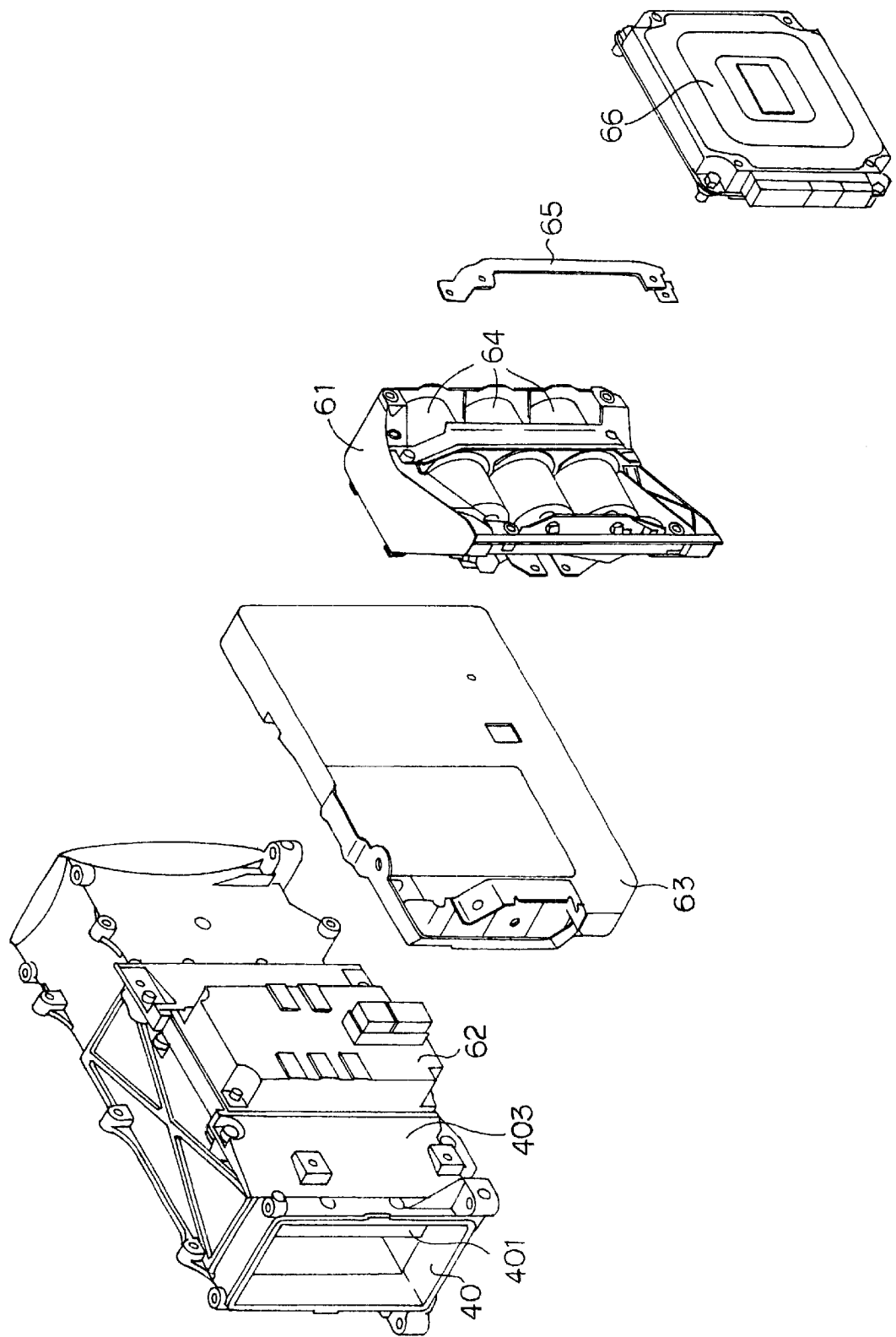
FIG. 4 is an exploded perspective view showing the positional relationship between the PDU and the air cooler.

A structure of the air cooler 23 including the heat sink case 40 with the PDU 9 and the down converter 10 will be explained referring to FIGS. 3 and 4. FIG. 3 is a front view of the air cooler 23 sandwiched between the PDU 9 and the down converter 10. FIG. 4 is an exploded perspective view showing the positional relationship between the PDU 9 and the heat sink case 40. As shown, a power module PM comprises the air cooler 23 located at the center and the PDU 9 and the down converter 10 disposed on both sides of the air cooler 23. The PDU 9 includes a power module body (IPM) 62 consisting of semiconductor switches, a large-size capacitor 64, and a controller 66 for the IPM 62, as shown in FIG. 4.

The air cooler 23 includes the heat sink case 40, a first heat sink 401 for the PDU 9, and a second heat sink 402 for the down converter 10. The first heat sink 401 comprises wave-like fins brazed to a plate 403 of the PDU 9. The second heat sink 402 comprises wave-like fins brazed to a plate of the down converter 10.

The two groups of the wave-like fins are arranged with their lengths of pitch equal to each other; particularly, the height H1 of the fins of the first heat sink 401 is higher than the height H2 of the fins of the second heat sink 402. The two heights H1 and H2 are not identical because the PDU 9 and the down converter 10 are different in the generation of heat. The two groups of the fins are identical in the length of pitch in order to allow the flow of cooling air to be not biased but uniform when running through the fins.

The other components of the PDU 9 are secured directly or indirectly to the plate 403 of the first heat sink 401 while the other components of the down converter 10 are secured to the plate of the second heat sink 402. The two plates of the first 401 and the second heat sink 402 are directly joined and tightened to one side of the heat sink case 40 of a box-like shape so that their fins are appropriately positioned in the heat sink case 40. The plate 403 is tightened by bolts (not shown) to the heat sink case 40 together with a holder 61 of the capacitor.

As best shown in FIG. 3, the duct assembly 39 is located before the heat sink case 40. The flow of air is introduced from an opening 39A in the duct assembly 39 into the first heat sink 401 and the second heat sink 402. The duct assembly 39 hence has the tube 34 provided for intaking the flow of air from the outside of the vehicle V. The grommet 41 is connected to the other side of the heat sink case 40 or the opposite side to the duct assembly 39 for discharging the flow of air from the heat sink case 40.

As shown in FIG. 4, the IPM 62 having a base of a radiator sheet (e.g. a copper strip) is seated on a central region of the plate 403 of the first heat sink 401 mounted to one side of the heat sink case 40. The IPM 62 is covered with an IPM case 63 on which the capacitor 64 supported by the holder 61 is placed. The controller 66 is anchored by a stay 65 onto the holder 61 of the capacitor 64.

The air inlet 21 of the air cooling system in the embodiment is located closely above the fuel tank 17, hence hardly permitting any object such as a cobble stone jumping from the road surface to straightforwardly enter the air inlet 21. Accordingly, the air inlet 21 can be prevented from being injured or choked with such an object. In case of running in the snow, adhesion of snow to the screen 33 of the air inlet 21 can also be avoided. The air inlet 21 will thus be prevented from being narrowed or blocked with frozen snow. Also, the exhaust outlet 26 is located closely above the silencer 19 and can hence be prevented from being frozen and reduced in the cross section by the escape of heat from the silencer 19.

The floor 16 is commonly made of a highly heat conductive material such as aluminum and when a higher temperature condition e.g. during the summer, can thus be cooled to a lower temperature than the outside by the cooling action in the interior of the vehicle. This allows the flow of air running from a passage between the floor 16 and the fuel tank 17 to the air inlet 21 to be effectively cooled by the lower temperature of the floor 16, hence improving the efficiency of action of the air cooler for the PDU and the down converter.

The fan 24 enables to shift the direction of the flow of air substantially 90 degrees while running from the inlet to the outlet. The shift of the direction of the flow of air through 90 degrees may be carried out by, for example, a sirocco fan without provision of the tubing. This allows the air cooling system of a right triangle shape to be economical and versatile for use in any vehicle. Also, the air inlet 21 and the exhaust outlet 26 are provided at two vertices of the right triangle shape defined by the first duct assembly of the tube 22 and the air cooler 23 and the second duct assembly of the tube 25 bent to substantially a right angle at the fan 24. This permits the space (distance) between the air inlet 21 and the exhaust outlet 26 to be maximized. Accordingly, exhaust gas from the exhaust outlet 26 will hardly be sucked into the air inlet 21 e.g. in the idling mode. The cooling action of the air cooler 23 will thus hardly be offset by a flow of warm air from the heated exhaust gas. As a result, heat generated by the PDU and the down converter during the idling can effectively be dissipated by the cooling action.

The mesh screen 33 is mounted in the air inlet 21 and enables to filter any object of greater than the mesh size which is thus disallowed to enter the air cooler 23. The mesh screen 33 prevents the fins of the heat sink from being broken and blocked, thus maintaining the cooling effect of the heat sink.

The air cooling system of the present invention is mounted on the floor 16 of a vehicle while its air inlet 21 and exhaust output 26 open downwardly of the vehicle or face against the road surface and stay out of sight behind the vehicle body. This contributes to the improvement in the respect of vehicle design.

Although the present invention has been described with reference to preferred embodiments, works skill in the art will recognize that changes may be made in form and detail without departing from the spirit and scope of the invention.

The present invention provides the following advantages:

(1) As the distance between the air inlet and the exhaust outlet is maximized, it can prevent a flow of warm air emitted from the exhaust outlet from returning back to the air inlet, thus assisting the cooling action particularly during the idling mode.

(2) As the air inlet is protected from any object from the road surface or snow entering directly, its injury or frozen can be avoided.

(3) As the direction of the flow of air is turned substantially 90 degrees with the use of no tubing, the apparatus can thus be simplified in the construction and reduced in the cost.

(4) As the exhaust outlet is prevented by heat released from the silencer connected to the exhaust pipe from being frozen, it can contribute to the improvement of the reliability of the apparatus.

(5) As the air inlet is located in front of the exhaust outlet on the vehicle, the flow of air can efficiently run from the air inlet to the exhaust outlet and effectively be directed by the action of the fan.

What is claimed is:

1. In combination:
    a vehicle, further comprising a down converter, a fuel tank, an exhaust pipe, and a power drive unit; and
    an air-intaking and exhausting apparatus in an air cooling system for the power drive unit, further comprising:
        an air inlet provided in the bottom of the vehicle to open downwardly;
        an air cooler for the power drive unit and the down converter connected by a first tube to the air inlet; and
        an exhaust outlet provided to open downwardly and connected by a second tube to the air cooler, wherein the first tube and the second tube are placed on a horizontal plane and extend substantially orthogonal to each other;
        wherein at least a portion of the air inlet faces against the top of a fuel tank.

2. An air-intaking and exhausting apparatus in an air cooling system for a power drive unit and a down converter according to claim 1, further comprising a floor consisting mainly of a horizontal portion and a slope portion which is located at the bottom of the vehicle and wherein the space between the floor and the fuel tank mounted close to the floor is contemplated to have a non-uniform width and a bent for preventing at least an object from the road surface from straightforwardly entering the air inlet.

3. The combination according to claim 1, wherein the air cooler includes a fan for inputting and outputting the flow of air to cool down the power drive unit and the down converter, and the fan is adapted for turning the direction of the flow of air substantially 90 degrees.

4. The combination according to claim 1, wherein at least either the air inlet or the exhaust outlet has a mesh screen fitted therein.

5. The combination according to claim 1, comprising a battery box that is rectangular in outline, and wherein the first tube and the second tube follow two adjacent sides of the battery box.

6. In combination:
    a vehicle, further comprising a down converter, a fuel tank, an exhaust pipe, and a power drive unit; and
    an air-intaking and exhausting apparatus in an air cooling system for the power drive unit, further comprising:
        an air inlet provided in the bottom of the vehicle to open downwardly;
        an air cooler for the power drive unit and the down converter connected by a first tube to the air inlet; and
        an exhaust outlet provided to open downwardly and connected by a second tube to the air cooler, wherein the first tube and the second tube are placed on a horizontal plane and extend substantially orthogonal to each other;
        further comprising a floor consisting mainly of a horizontal portion and a slope portion which is located at the bottom of the vehicle and wherein the space between the floor and the fuel tank mounted close to the floor is contemplated to have a non-uniform width and a bend for preventing at least an object from the road surface from straightforwardly entering the air inlet.

7. The combination according to claim 6, wherein the air cooler includes a fan for inputting and outputting the flow of air to cool down the power drive unit and the down converter, and the fan is adapted for turning the direction of the flow of air substantially 90 degrees.

8. The combination according to claim 6, wherein at least either the air inlet or the exhaust outlet has a mesh screen fitted therein.

9. The combination according to claim 6, comprising a battery box that is rectangular in outline, and wherein the first tube and the second tube follow two adjacent sides of the battery box.

10. In combination:
    a vehicle, further comprising a down converter, a fuel tank, an exhaust pipe, and a power drive unit; and
    an air-intaking and exhausting apparatus in an air cooling system for the power drive unit, further comprising:
        an air inlet provided in the bottom of the vehicle to open downwardly;
        an air cooler for the power drive unit and the down converter connected by a first tube to the air inlet; and
        an exhaust outlet provided to open downwardly and connected by a second tube to the air cooler, wherein the first tube and the second tube are placed on a horizontal plane and extend substantially orthogonal to each other;

wherein the exhaust outlet is located above a silencer connected to the exhaust pipe;

whereby the exhaust outlet is heated by the silencer and the exhaust outlet is not frozen, narrowed, or blocked.

11. The combination according to the claim 10, further comprising a floor consisting mainly of a horizontal portion and a slope portion which is located at the bottom of the vehicle and wherein the space between the floor and the fuel tank mounted close to the floor is contemplated to have a non-uniform width and a bend for preventing at least an object from the road surface from straightforwardly entering the air inlet.

12. The combination according to claim 10, wherein the air cooler includes a fan for inputting and outputting the flow of air to cool down the power drive unit and the down converter, and the fan is adapted for turning the direction of the flow of air substantially 90 degrees.

13. The combination according to claim 10, wherein at least either the air inlet or the exhaust outlet has a mesh screen fitted therein.

14. The combination according to claim 10, comprising a battery box that is rectangular in outlined, and wherein the first tube and the second tube follow two adjacent sides of the battery box.

15. In combination:

a vehicle, further comprising a down converter, a fuel tank, an exhaust pipe, and a power drive unit; and an air-intaking and exhausting apparatus in an air cooling system for the power drive unit, further comprising:

an air inlet provided in the bottom of the vehicle to open downwardly;

an air cooler for the power drive unit and the down converter connected by a first tube to the air inlet; and an exhaust outlet provided to open downwardly and connected by a second tube to the air cooler, wherein the first tube and the second tube are placed on a horizontal plane and extend substantially orthogonal to each other;

wherein the air inlet is located in front of the exhaust outlet on the vehicle;

whereby a flow of air runs efficiently from the air inlet to the exhaust outlet.

16. The combination according to claim 15, further comprising a floor consisting mainly of a horizontal portion and a slope portion which is located at the bottom of the vehicle and wherein the space between the floor and the fuel tank mounted close to the floor is contemplated to have a non-uniform width and a bent for preventing at least an object from the road surface from straightforwardly entering the air inlet.

17. The combination according to claim 15, wherein the air cooler includes a fan for inputting and outputting the flow of air to cool down the power drive unit and the down converter, and the fan is adapted for turning the direction of the flow of air substantially 90 degrees.

18. The combination according to claim 15, wherein at least either the air inlet or the exhaust outlet has a mesh screen fitted therein.

19. The combination according to claim 15, comprising a battery box that is rectangular in outline, and wherein the first tube and the second tube follow two adjacent sides of the battery box.

* * * * *